(12) United States Patent
Gogolev et al.

(10) Patent No.: US 11,652,757 B2
(45) Date of Patent: May 16, 2023

(54) SYSTEM AND METHOD FOR ENABLING TSN-STREAM CONFIGURATION

(71) Applicant: ABB Schweiz AG, Baden (CH)

(72) Inventors: Alexander Gogolev, Mannheim (DE); Thomas Gamer, Bruehl (DE); Jorgen Gade, Vaesteras (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/411,069

(22) Filed: Aug. 25, 2021

(65) Prior Publication Data
US 2022/0070114 A1  Mar. 3, 2022

(30) Foreign Application Priority Data

Aug. 27, 2020 (EP) .................................... 20193097

(51) Int. Cl.
*H04L 47/70* (2022.01)
*H04L 47/283* (2022.01)
*H04L 47/80* (2022.01)

(52) U.S. Cl.
CPC .......... *H04L 47/822* (2013.01); *H04L 47/283* (2013.01); *H04L 47/805* (2013.01)

(58) Field of Classification Search
CPC .... H04L 47/822; H04L 47/283; H04L 47/805
See application file for complete search history.

(56) References Cited

U.S. PATENT DOCUMENTS

| | | | |
|---|---|---|---|
| 11,159,435 B2 * | 10/2021 | Kande | H04L 65/80 |
| 2006/0098657 A1 | 5/2006 | Vasseur et al. | |
| 2018/0278541 A1 * | 9/2018 | Wu | H04L 41/0816 |
| 2019/0253339 A1 | 8/2019 | Mehmedagic | |
| 2019/0364527 A1 | 11/2019 | Kwon | |
| 2021/0250787 A1 * | 8/2021 | Kolding | H04W 24/02 |
| 2021/0274585 A1 * | 9/2021 | Yu | H04L 12/1407 |
| 2022/0046462 A1 * | 2/2022 | De Andrade Jardim | H04L 47/283 |
| 2022/0217051 A1 * | 7/2022 | Zhang | H04L 41/0896 |

* cited by examiner

*Primary Examiner* — Chi H Pham
*Assistant Examiner* — Weibin Huang
(74) *Attorney, Agent, or Firm* — Leydig, Voit & Mayer, Ltd.

(57) ABSTRACT

A system for enabling Time-Sensitive Networking (TSN)-stream configuration of a TSN network includes: a gathering device for gathering resource utilization information from TSN switches of the TSN-stream configuration as gathered resource utilization information; and a tool device for providing a TSN stream path calculation based on the gathered resource utilization information and allocating stream paths and establishing channel multiplexing in the TSN network based on the gathered resource utilization information.

9 Claims, 4 Drawing Sheets

SYSTEM AND METHOD FOR ENABLING TSN-STREAM CONFIGURATION

CROSS-REFERENCE TO PRIOR APPLICATION

Priority is claimed to European Patent Application No. EP 20193097.1, filed on Aug. 27, 2020, the entire disclosure of which is hereby incorporated by reference herein.

FIELD

The present invention relates to a system and a method for resource-aware channel multiplexing for Time-Sensitive Networking, TSN.

BACKGROUND

In the Industry 4.0 concept IEEE Time-Sensitive Networking (TSN) serves as a communication layer for new automation systems. TSN mechanisms are defined in several (also upcoming) IEEE standards that enable determinism via precise time synchronization, QoS traffic guarantees, and seamless redundancy.

Key component of the TSN network is a TSN bridge, also called switch. A TSN network is built of connected TSN switches that are tightly synchronized to each other, the market already offers such switches. These switches can manage traffic in a time-coordinated manner. TSN functionality is rooted in transmitting and receiving data in hard real-time manner.

Each TSN switch has a precise clock that is constantly adjusted to the master clock (dedicated, remote). It also has eight queues of data buffers on each TSN port. Each of these queues serves a designated priority level, mapped to one of eight QoS classes.

For each port there is a schedule that periodically opens or closes the queues at a specified time for a specified duration. The overall schedule period is typically a smallest common multiplier of all periods there. Those schedules are synchronized to the clock and, therefore, to the network and queues on other switches. This allows to configure uninterrupted data transmission "corridors" for cyclic time/critical data through the whole network that guarantee minimal communication latency and jitter.

In an automation network critical data must be communicated reliably and with minimal latency and jitter. This data is produced and consumed by different end devices, and it often shares the same physical links while passing through the network. It is also often produced with different periods. When those periods are sufficiently different, passing of the data through the same physical link can become impossible, since the port real-time schedule periods have limited configurability.

SUMMARY

In an embodiment, the present invention provides a system for enabling Time-Sensitive Networking (TSN)-stream configuration of a TSN network, the system comprising: a gathering device configured to gather resource utilization information from TSN switches of the TSN-stream configuration as gathered resource utilization information; and a tool device configured provide a TSN stream path calculation based on the gathered resource utilization information and allocate stream paths and establish channel multiplexing in the TSN network based on the gathered resource utilization information.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

Figure 7:
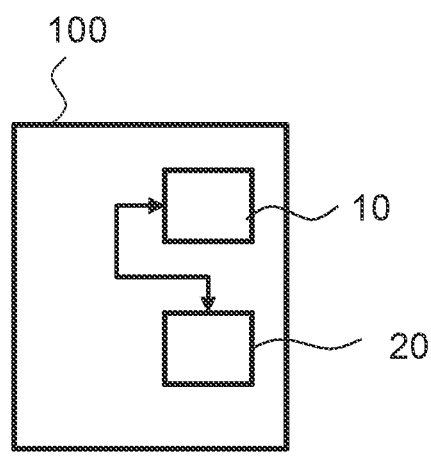
Figure 8:
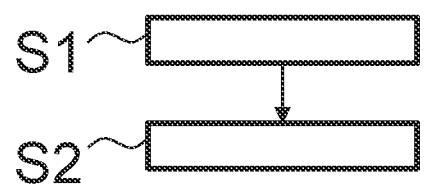

Each of FIG. 3 to FIG. 6 shows an example of a schematic process diagram for enabling Time-Sensitive Networking, TSN,-stream configuration of a TSN network according to an exemplary embodiment of the present patent application;

FIG. 7 shows an example of a system for enabling Time-Sensitive Networking, TSN,-stream configuration of a TSN network according to an exemplary embodiment of the present patent application;

FIG. 8 shows an example of a method for enabling Time-Sensitive Networking, TSN,-stream configuration of a TSN network according to an exemplary embodiment of the present patent application;

DETAILED DESCRIPTION

In an embodiment, the present invention provides an improved TSN stream configuration with channel multiplexing to resolve path calculation for TSN streams with incompatible periods. The invention can be realized as a method implemented in a software, SW, tool that allows TSN stream path calculation and/or configuration with improved throughput utilization.

In a first aspect, there is provided a system for enabling Time-Sensitive-Networking, TSN,-stream configuration of a TSN network, the system comprising: a gathering device, which is configured to gather resource utilization information from TSN switches of the TSN-stream configuration; and a tool device, which is configured to provide a TSN stream path calculation based on the gathered resource utilization information and which is configured to allocate stream paths and to establish channel multiplexing in the TSN network based on the gathered resource utilization information.

The present invention advantageously provides that the TSN network operates based on the existing Ethernet infrastructure and obeys certain rules of operation. However, for industrial use it can be configured in certain non-legacy modes, for instance, the data paths are not necessarily configured using existing routing algorithms.

Existing routing algorithms often "simplify" the topology, e.g., eliminating possible loops in favor of tree/star topologies. TSN has a dedicated technology (Frame Replication and Elimination for Reliability (FRER), IEEE 802.1CB) for redundancy management, but it is out of scope of the present invention.

The scope of the present invention is efficient path allocation for the data using multiplexed channels.

In a second aspect, there is provided a method.

As a first step of the method the following is performed: gathering resource utilization information from TSN switches of the TSN-stream configuration As a second step of the method the following is performed: providing a TSN stream path calculation based on the gathered resource utilization information and allocating stream paths and establishing channel multiplexing in the TSN network based on the gathered resource utilization information.

According to an exemplary embodiment of the present invention, the tool device is configured to use user input for newly configured network parts of the TSN network in order to provide the TSN stream path calculation.

According to an exemplary embodiment of the present invention, the gathering device is configured to use a load discovery mode.

According to an exemplary embodiment of the present invention, the tool device is configured to allocate stream paths by analyzing conflicts in the TSN network.

According to an exemplary embodiment of the present invention, the system is configured to operate in an online manner.

According to an exemplary embodiment of the present invention, the system is configured to operate in an offline manner.

According to an exemplary embodiment of the present invention, the system is integrated as a distributed network component with multiple entities of the TSN-network.

According to an exemplary embodiment of the present invention, the system is integrated as a centralized network component in terms of one entity of the TSN-network.

According to an exemplary embodiment of the present invention, the tool device is configured to provide link multiplexing and/or resource discovery.

The above aspects and examples will become apparent from and be elucidated with reference to the embodiments described hereinafter.

Figure 1:
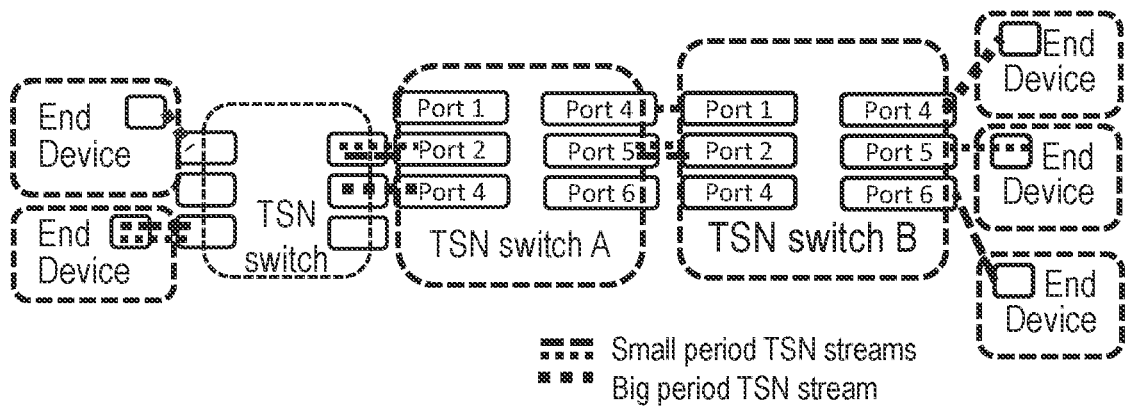
FIG. 1 shows a schematic illustration of a schematic process diagram for enabling Time-Sensitive Networking, TSN,-stream configuration of a TSN network according to an exemplary embodiment of the present patent application.

FIG. 1 shows a schematic illustration of a schematic process diagram for enabling Time-Sensitive Networking, TSN,-stream configuration of a TSN network according to an exemplary embodiment of the present patent application.

FIG. 1 presents an example of TSN network where channels between switches A and B are multiplexed, e.g., to increase the mutual throughput capacity. FIG. 1 focuses on the same network with two TSN streams that connect five end devices (the streams are co-directed).

The depicted stream is not sharing the link between switches A and B with the other two streams due to, for instance, capacity/timing requirements: link between ports 4 and 1 is configured for large period cyclic streams, and thus cannot handle small period cyclic streams. This can happen because of the limited granularity of the real-time schedules on the switches: it can be flexibly configured for low periods or large periods, but not both simultaneously.

Figure 2:
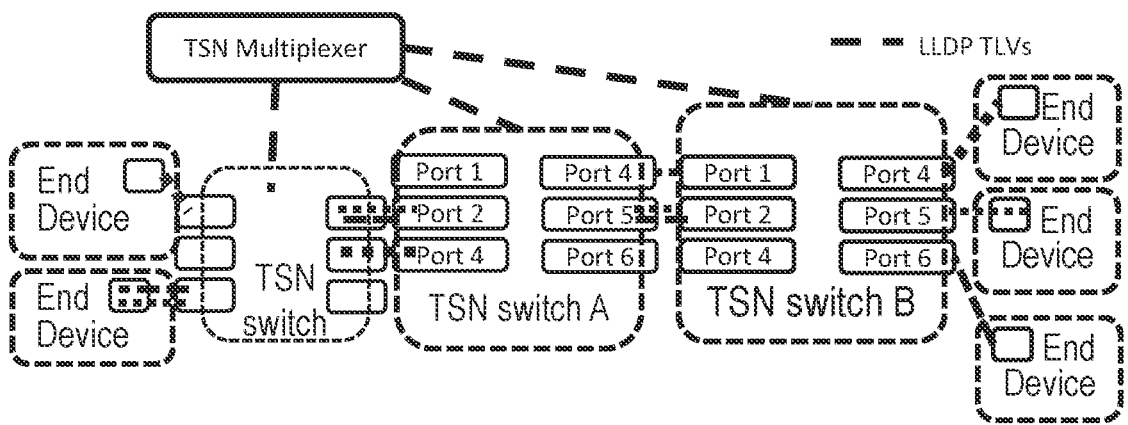
FIG. 2 shows an example of a schematic process diagram for enabling Time-Sensitive Networking, TSN,-stream configuration of a TSN network according to an exemplary embodiment of the present patent application.

FIG. 2 shows an example of a schematic process diagram according to an exemplary embodiment of the present patent application.

Currently discussed tools do not address the problem, when TSN streams cannot share the same ports because of different periods. The TSN Multiplexer offers optional stream path configuration for such TSN streams using channel multiplexing. It can use the user input for newly configured networks or utilize (e.g. LLDP) data gathered from TSN switches in case of existing networks (load discovery mode).

According to an exemplary embodiment of the present invention, subsequently, it will try to allocate the stream paths through the system and in case of conflicts, suggest multiplexing of the ports where necessary, it can be used in:

i. a centralized, or even offline manner (e.g., as a part of the system engineering tool/CUC/CNC); or ii. a distributed, online manner (as a part of each TSN switch SW).

Figure 3:
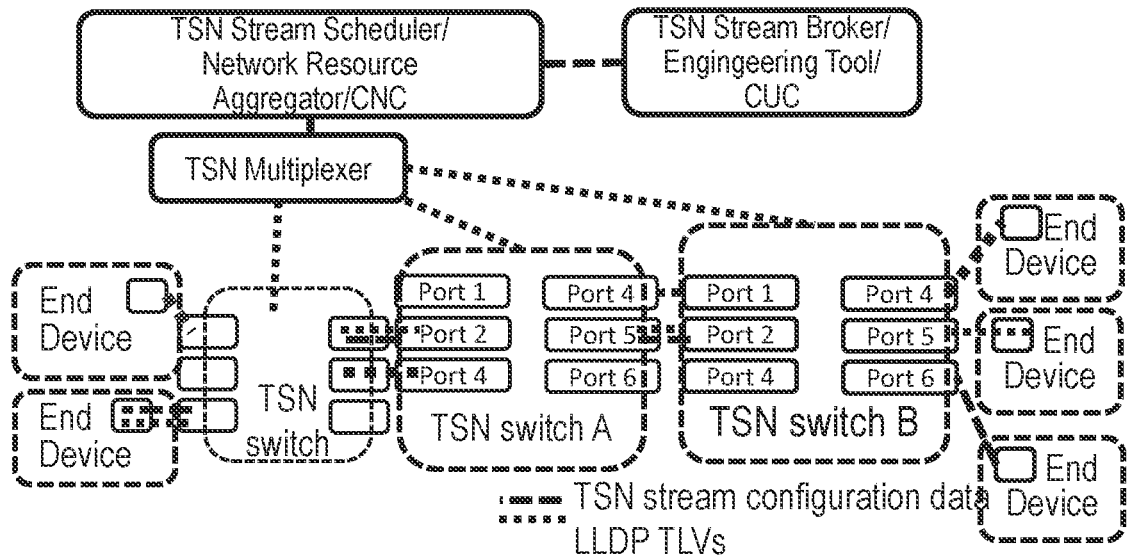

According to an exemplary embodiment of the present invention, according to the first case, as shown in FIG. 2, the designed network topology will reflect the necessary channel multiplexing suggested by the TSN multiplexer, according to the second case, as shown in FIG. 3, physical link multiplexing needs to be already in place, and the TSN switches will send the TSN streams to the ports where the schedule best matches the stream period.

Each of FIG. 3 to FIG. 6 shows an example of a schematic process diagram according to an exemplary embodiment of the present patent application.

According to an exemplary embodiment of the present invention, FIG. 2 and FIG. 3 show examples of a network where co-directed TSN streams are de-multiplexed between two physical multiplexed links, because they have incompatible timing requirements (periods).

According to an exemplary embodiment of the present invention, it is provided how the resource utilization information is gathered using LLDP TLVs from switches to multiplexer and further to system configuration tools. Next, FIG. 3 shows how a distributed version of the TSN multiplexer can choose the exit ports for TSN stream request, based on its period.

According to an exemplary embodiment of the present invention, the TSN Multiplexer enables resource-aware TSN stream multiplexing and/or demultiplexing based on their operational cycles (periods), improving the resource utilization for the whole network. This enables the operation as system-wide software configuration tools.

According to an exemplary embodiment of the present invention, the TSN multiplexer can be developed as a standalone module, or as a plug-in component:

According to an exemplary embodiment of the present invention, the system is configured as a link multiplexing only, for various reasons (offers a choice of stream separation) or resource discovery plus multiplexing (automatically aggregates streams with similar periods)

This allows to plan the TSN streams with respect to their periods (cycle times)

A centralized TSN link multiplexer does not have to gather the traffic load data dynamically (e.g., via LLDP), while the distributed version of it must possess the knowledge of the actual traffic load distribution and respective parameters.

According to an exemplary embodiment of the present invention the TSN link multiplexer can be implemented and executed as:

i.) distributed function—part of the local switch firmware/software or, ii.) centralized function—part of a remote system (such as runs the CUC/CNC functionality), i.e., a fog node, an edge node or the like.

According to an exemplary embodiment of the present invention the hybrid function with distributed and centralized SW can be implemented.

FIG. 7 shows an example of a system for enabling Time-Sensitive Networking, TSN,-stream configuration of a TSN network according to an exemplary embodiment of the present patent application.

Figure 4:
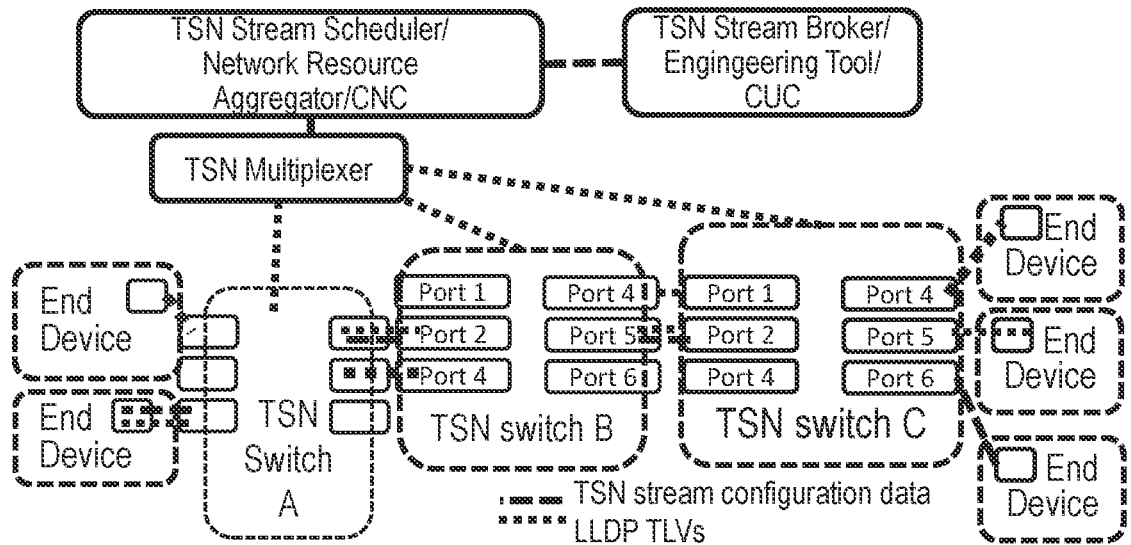
Figure 5:
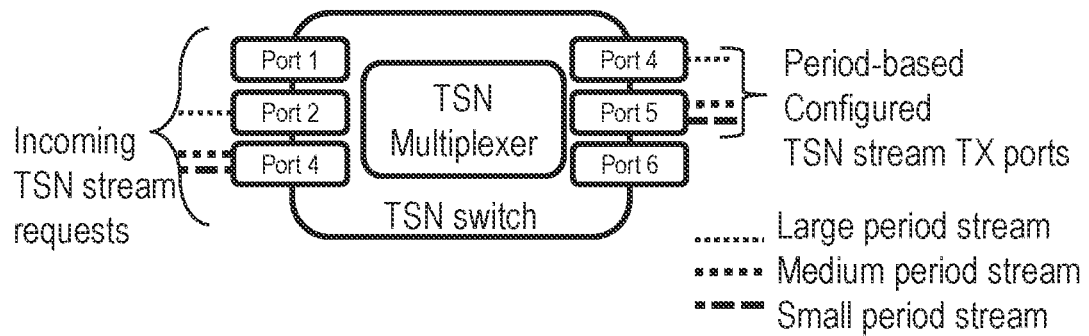
Figure 6:
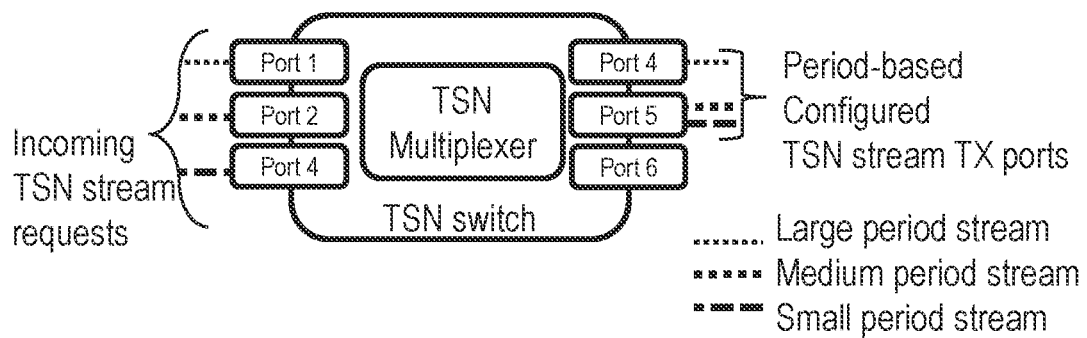

A system 100 for enabling Time-Sensitive Networking, TSN,-stream configuration of a TSN network is depicted in FIG. 4.

The system 100 further comprises a gathering device 10, which is configured to gather resource utilization information from TSN switches of the TSN-stream configuration.

The system 100 further comprises a tool device 20, which is configured to provide a TSN stream path calculation based on the gathered resource utilization information and which is configured to allocate stream paths and to establish channel multiplexing in the TSN network based on the gathered resource utilization information.

FIG. 8 shows an example of a method for enabling Time-Sensitive Networking, TSN,-stream configuration of a TSN network according to an exemplary embodiment of the present patent application.

As a first step of the method the following is performed: gathering S1 resource utilization information from TSN switches of the TSN-stream configuration As a second step of the method the following is performed: providing S2 a TSN stream path calculation based on the gathered resource utilization information and allocating stream paths and establishing channel multiplexing in the TSN network based on the gathered resource utilization information.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for enabling Time-Sensitive Networking (TSN)-stream configuration of a TSN network, the system comprising:
    a gathering device configured to gather resource utilization information from TSN switches of the TSN-stream configuration as gathered resource utilization information; and
    a tool device configured to provide a TSN stream path calculation based on the gathered resource utilization information and allocate stream paths and establish channel multiplexing in the TSN network based on the gathered resource utilization information,
    wherein the tool device is configured to use user input for newly configured network parts of the TSN network to provide the TSN stream path calculation.

2. The system of claim 1, wherein the gathering device is configured to use a load discovery mode.

3. The system of claim 1, wherein the tool device is configured to allocate stream paths by analyzing conflicts in the TSN network.

4. The system of claim 1, wherein the system is configured to operate in an online manner.

5. The system of claim 1, wherein the system is configured to operate in an offline manner.

6. The system of claim 1, wherein the system is integrated as a distributed network component with multiple entities of the TSN-network.

7. The system of claim 1, wherein the system is integrated as a centralized network component in terms of one entity of the TSN-network.

8. The system of claim 1, wherein the tool device is configured to provide link multiplexing and/or resource discovery.

9. A method for enabling Time-Sensitive Networking (TSN)-stream configuration of a TSN network, the method comprising:
    gathering resource utilization information from TSN switches of the TSN-stream configuration as gathered resource utilization information;
    providing a TSN stream path calculation based on the gathered resource utilization information and allocating stream paths and establishing channel multiplexing in the TSN network based on the gathered resource utilization information; and
    using user input for newly configured network parts of the TSN network to provide the TSN stream path calculation.

* * * * *